US010366565B2

(12) United States Patent
Gnanasundram et al.

(10) Patent No.: US 10,366,565 B2
(45) Date of Patent: Jul. 30, 2019

(54) FRAMEWORKS AND METHODOLOGIES FOR DELIVERING ELECTRONIC GAMING MACHINE USER INTERFACES ACROSS MULTIPLE CLIENT PLATFORMS

(71) Applicant: Ainsworth Game Technology Limited, Newington (AU)

(72) Inventors: Baheerathan Gnanasundram, Wentworthville (AU); Vincent Carmelo Bruzzese, Oatlands (AU); Vishwanath Halyal, Newington (AU)

(73) Assignee: Ainsworth Game Technology Limited, Newington, NSW (AU)

( * ) Notice: Subject to any disclaimer, the term of this patent is extended or adjusted under 35 U.S.C. 154(b) by 278 days.

(21) Appl. No.: 15/047,358

(22) Filed: Feb. 18, 2016

(65) Prior Publication Data

US 2016/0240040 A1 Aug. 18, 2016

(30) Foreign Application Priority Data

Feb. 18, 2015 (AU) ................................ 2015900553

(51) Int. Cl.
*G06F 17/00* (2019.01)
*G07F 17/32* (2006.01)

(52) U.S. Cl.
CPC ...... *G07F 17/3244* (2013.01); *G07F 17/3223* (2013.01); *G07F 17/3234* (2013.01)

(58) Field of Classification Search
None
See application file for complete search history.

(56) References Cited

U.S. PATENT DOCUMENTS

| | | | | |
|---|---|---|---|---|
| 8,974,306 | B2 | 3/2015 | Topham et al. | |
| 2002/0077169 | A1* | 6/2002 | Kelly ...................... | A63F 3/081 463/16 |
| 2003/0176213 | A1 | 9/2003 | LeMay et al. | |
| 2008/0227538 | A1* | 9/2008 | Kelly ...................... | A63F 3/081 463/27 |
| 2009/0118022 | A1* | 5/2009 | Lyons .................... | G06Q 30/02 463/42 |
| 2009/0233705 | A1* | 9/2009 | LeMay ................... | G07F 17/32 463/25 |
| 2010/0105454 | A1* | 4/2010 | Weber .................... | G06Q 30/02 463/1 |
| 2011/0086706 | A1* | 4/2011 | Zalewski ................ | G06F 3/017 463/36 |
| 2015/0326639 | A1 | 11/2015 | Nelson et al. | |

* cited by examiner

*Primary Examiner* — Paul A D'Agostino
(74) *Attorney, Agent, or Firm* — Cook Alex Ltd.

(57) ABSTRACT

Described herein are frameworks and methodologies for delivering electronic gaming machine user interfaces across multiple client platforms. Embodiments of the invention have been particularly developed for providing electronic casino-type games across a range of client devices, including various forms of mobile device, computing devices, smart TVs, consoles, and the like. While some embodiments will be described herein with particular reference to that application, it will be appreciated that the invention is not limited to such a field of use, and is applicable in broader contexts.

17 Claims, 17 Drawing Sheets

FRAMEWORKS AND METHODOLOGIES FOR DELIVERING ELECTRONIC GAMING MACHINE USER INTERFACES ACROSS MULTIPLE CLIENT PLATFORMS

BACKGROUND

The present invention relates to frameworks and methodologies for delivering electronic gaming machine user interfaces across multiple client platforms. Embodiments of the invention have been particularly developed for providing electronic casino-type games across a range of client devices, including various forms of mobile device. While some embodiments will be described herein with particular reference to that application, it will be appreciated that the invention is not limited to such a field of use, and is applicable in broader contexts.

Any discussion of the background art throughout the specification should in no way be considered as an admission that such art is widely known or forms part of common general knowledge in the field.

In recent years, various attempts have been made to provide users with access to casino-type games on their own devices (such as smartphones, personal computers, and the like). Broadly speaking, these attempts have failed to adequately replicate a traditional "in-casino" experience, for example due to less-than-ideal user interfaces, technology-driven modifications to games, and various other factors.

SUMMARY

It is an object of the present invention to overcome or ameliorate at least one of the disadvantages of the prior art, or to provide a useful alternative.

One embodiment provides a computer implemented method, performed by a client terminal, for providing a casino-type game at the client terminal, the method including:

defining a request to play a user-selected game at the client terminal;

in response to the defining of the request, downloading, from a first remote server, a set of computer executable code that enables rendering of graphical user interface components for the user-selected game, wherein the set of computer executable code is identified based on (i) the user-selected game; and (ii) one or more characteristics of the client terminal;

in response to a user interaction with a specific one or more of the rendered user interface components, defining upstream game performance data for transmission to a second remote server, thereby to enable a gameplay instance to be implemented at a remotely executing virtual gaming machine that provides the user-selected game; and providing graphical stimuli via one or more of the rendered user interface components in response to downstream game performance data received by the client terminal, the downstream game performance data being defined subject to completion of the gameplay instance once implemented at the remotely executing virtual gaming machine that provides the user-selected game.

One embodiment provides a computer implemented method wherein the one or more characteristics of the client terminal include a device hardware type.

One embodiment provides a computer implemented method wherein the one or more characteristics of the client terminal include a device operating system.

One embodiment provides a computer implemented method wherein the gameplay instance is implemented subject to a wager verified by a gaming service provider server.

One embodiment provides a computer implemented method wherein:

the set of computer executable code that enables rendering of graphical user interface components for the user-selected game is downloaded from a first server;

the virtual gaming machine executes at a second server remote of the first server; and data indicative of player credit used to play the virtual gaming machine is stored at a third server remote of the first and second servers.

One embodiment provides a computer implemented method of providing casino-type games to a plurality of distributed users, the method including:

providing a plurality of playable games;

in response to a request associated with a given user, initiating a virtual gaming machine to provide a specific one of the games selected by the specific user;

enabling wager-based play on the game, subject to interaction with a gaming service provider player which maintains data indicative of gaming credit associated with the given user;

providing output configured to enable rendering of graphical stimuli via one or more user interface components rendered at a client device associated with the given user;

wherein the one or more user interface components specific to (i) the user-selected game; and (ii) one or more characteristics of the client terminal.

One embodiment provides a computer implemented method wherein the user is enabled to control the specific game provided by the virtual gaming machine via multiple client devices associated with the user, wherein a first one of the multiple client devices has a first set of hardware and operating system characteristics, wherein a second one of the multiple client devices has a second set of hardware and operating system characteristics; and wherein the one or more user interface components rendered on the first one of the client devices are provided to the first one of the client devices responsive to identification of the first set of hardware and operating system characteristics, and wherein the one or more user interface components rendered on the second one of the client devices are provided to the second one of the client devices responsive to identification of the second set of hardware and operating system characteristics.

One embodiment provides a computer implemented method wherein the user is enabled to play a first gameplay instance using the first one of the client devices and a second gameplay instance, successively following the first gameplay instance, using the second one of the client devices.

One embodiment provides a computer implemented method wherein the plurality of playable games are each playable on any one of a set of client device types, wherein the client device types include at least two of: personal computers; smartphones tablets; and electronic gaming machine terminals.

One embodiment provides a computer implemented method for providing a linked jackpot game, the method including:

receiving input indicative of gameplay at a plurality of virtual gaming machines, wherein each virtual gaming machine is controlled by a user of a remote client device, wherein the client devices include:

a first one of the client devices that has a first set of hardware and operating system characteristics, wherein the first client device renders user interface components that are optimised for the first set of hardware and operating system characteristics;

a second one of the multiple client devices that has a second set of hardware and operating system characteristics, wherein the second client device renders user interface components that are optimised for the second set of hardware and operating system characteristics; and conducting a linked game based on the received input.

One embodiment provides a computer implemented method wherein each client terminal is configured to:

download, from a first remote server, a set of computer executable code that enables rendering of graphical user interface components for the user-selected game, wherein the set of computer executable code is identified based on (i) the user-selected game; and (ii) one or more characteristics of the client terminal;

in response to a user interaction with a specific one or more of the rendered user interface components, define upstream game performance data for transmission to a second remote server, thereby to enable a gameplay instance to be implemented at a remotely executing virtual gaming machine that provides the user-selected game; and provide graphical stimuli via one or more of the rendered user interface components in response to downstream game performance data received by the client terminal, the downstream game performance data being defined subject to completion of the gameplay instance once implemented at the remotely executing virtual gaming machine that provides the user-selected game.

One embodiment provides a computer implemented method including additionally receiving input from a plurality of gaming machines executing in a venue, wherein each of the plurality of gaming machines executing in a venue and each of the plurality of virtual gaming machines controlled by a user of a remote client devices compete in the same linked game.

One embodiment provides a computer implemented method for providing casino-type gaming to a user, the method including:

identifying a user playing a given game at a first device;

saving, at a central location, data indicative of the game session at the first device as a first game session;

identifying the user via a second device;

presenting to the user, via the second device, data indicative of one or more saved game sessions, including the first game session; and enabling the user to continue the first game session at the second device.

One embodiment provides a computer implemented method including saving, at the central location, data indicative of the continued game session as a second game session, thereby to enable the user to continue the second game session at a device other than the second device.

One embodiment provides a computer implemented method for defining game interface data for a casino-type game, the method including:

receiving game asset data in a predefined form, wherein the game asset data is associated with the casino-type game;

applying a set of platform-specific user interface protocols to the game asset data; and based on application of the protocols, defining platform-specific game interfaces for the game, thereby to enable a user interface for the game to be rendered at a client device based on one or more attributes of the client device.

One embodiment provides a computer implemented method including:

receiving data indicative of a new platform-specific user interface protocol;

applying the new platform-specific user interface protocol to multiple sets of game asset data, each being stored in a predefined form, wherein each set game asset data is associated with a respective casino-type game, thereby to define respective game interfaces for each of the games associated with the multiple sets of game asset data for a platform associated with the new platform-specific user interface protocol.

One embodiment provides a computer program product for performing a method as described herein.

One embodiment provides a non-transitive carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which.

DETAILED DESCRIPTION OF VARIOUS EMBODIMENTS

Figure 1A:
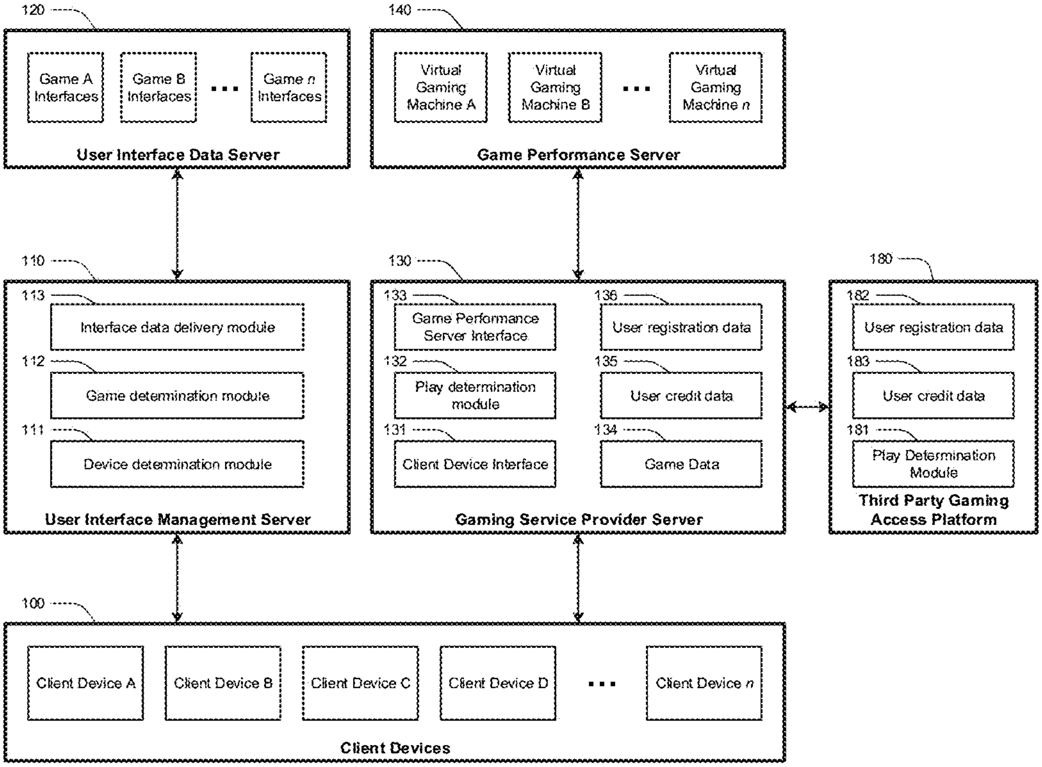
FIG. 1A to FIG. 1H schematically illustrate frameworks according to various embodiments.

Described herein are frameworks and methodologies for delivering electronic gaming machine user interfaces across multiple client platforms. Embodiments of the invention have been particularly developed for providing electronic casino-type games across a range of client devices, including various forms of mobile device, computing devices, smart TVs, consoles, and the like. While some embodiments will be described herein with particular reference to that application, it will be appreciated that the invention is not limited to such a field of use, and is applicable in broader contexts.

As used herein, the term "casino-type game" refers to an electronic game wherein one or more players provide wagers in consideration for participation in a game of chance. Examples include the likes of slot games, video poker, Keno games, video blackjack, video roulette, and so on. These games are conventionally played on terminals located within gaming venues (such as casinos, clubs, and other venues). The present disclosure has particular relevant to situations where these games are additionally/aternately played on user's own computing devices, which may include the likes of personal computers, smartphones, tablets, and so on.

The term "electronic gaming machine user interface" is used to describe a user interface that provides to a user functionality of an electronic gaming machine. Conventionally, an electronic gaming machine is a hardware unit having one or more display screens, and user inputs (which may include buttons, a touch screen interface, and so on). An "electronic gaming machine user interface" provides functionality corresponding to such a display screen and user inputs via a device that renders the interface. For example, an electronic gaming machine user interface may execute on an electronic gaming machine, a personal computer (for example within a proprietary app or via a web browser window), a smartphone, a tablet, a smart TV, or substantially any other device configured to provide computing functionalities. The manner by which the user interface is defined (for example the nature of computer executable code) and displayed will vary depending on characteristics of the device and/or operating system.

Overview

Described herein are exemplary technological frameworks that enable the delivery of casino-type games to multiple client devices, whilst isolating the game logic for the games from hardware and operating system peculiarities of various forms of client devices. This is achieved, in general terms, by in essence splitting a game into two components:

(i) Game logic data. This is data that defines how a game performs, for example the random number generator, win and payout rules, special feature triggers, and so on. It is the computer executable code that enable the game to be executed at a mathematical level.

(ii) Game user interface data. This data defines how a user interface displays the game; the game's visual appearance. For example, this is defined by computer executable code that enables rendering of graphical user interface components of the game.

The technology described herein leverages a principle that the game logic data may be the same irrespective of a user device that is operated to play the game, whereas game user interface data may have to be quite different. For example, consider a hypothetical slot machine game "Game A". There may be a desire to provide Game A to players in a gaming venue (where they operate electronic gaming machine terminals), to users of specific iOS/Android/Windows smartphones (which have a common operating system and screen size) and to users of PCs that implement a given web common web browser application. The game logic data can be the same in each case. However, due to characteristics such as screen aspect ratios, input device characteristics (e.g. touchscreen vs. buttons), operating system nuances (for example some smartphone devices respond in a specific manner to certain touch gestures at an operating system level), audio handling characteristics, and so on, the game user interface data needs to be quite different.

In overview, approaches described herein cause a client device to interact (directly or indirectly) with two sources of game data. The first source, referred to herein as a user interface management server, is responsible for identifying characteristics of the client terminal, and causing appropriate game user interface data (i.e. an appropriate set of code defining user interface components for a user-selected game) to be downloaded for rending at the client device. The second source is referred to herein as a game performance server, which is configured to execute a virtual gaming machine based on the game logic data. The user visual experience is in this manner specifically optimised for the user's device. The gameplay itself remains the same as it would be from any other form of client device.

There is typically a third category of server involved in provision of gaming to users, referred to herein as a gaming service provider server. This is a server with which a user registers, and obtains credits (for example in exchange for financial consideration) with which to wager in casino-type games. The game performance server interacts with the game service provider server thereby to validate and update a user's credit amount in the context of gameplay.

The technology described herein approach allows for various significant results, for example:

- Users are able to play their favourite casino-type games from a wide variety of Internet connected devices.
- Game programmers need only define one set of game logic data for a given game, and have that game playable across multiple user platforms.
- In many cases, only one set of game logic data requires regulatory approval, even though the game is playable across various user platforms based on different game user interface data.
- Multiple sets of user interface components are defined for the various user platforms (for example images of varied resolutions, different audio files, and so on). This may be achieved based on a standardised protocol, such a protocol preferably being defined in a manner to enable automated generation of game user interface data for new hardware and/or operating systems that are developed.

- Users are in some embodiments able to play the same game (in some cases via the same server-side virtual gaming machine) substantially simultaneously from multiple devices.
- Users are in some embodiments able to play a specific physical machine in a physical gaming venue from a remote device (for example where the gaming venue virtualises games in its physical machines, such that the game logic is executed at a server rather on the physical machine itself).
- Linked gaming may be provided in a cross-platform manner. That is, virtual gaming machines interact with linked game controllers, hence allowing users of multiple device types to participate in a common linked game. This may be a linked game in which physical machines in a gaming venue participate (this allowing a user to participate in a venue's linked game from a remote location using their smartphone or the like).

The manner by which such results are able to be achieved will be apparent from technical disclosure and examples provided below.

Exemplary Frameworks

FIG. 1A to FIG. 1H illustrate exemplary frameworks according to various embodiments. Similar features are denoted by corresponding reference numerals.

Each example illustrates a plurality of client devices 100, being Client Device A to Client Device n. The client devices include a range of different hardware devices, with differing operating systems. By way of example:

- Hardware devices 100 include devices falling into varied hardware categories, including smartphones, tablets, personal computers, and in-venue gaming terminals, and others.
- Within a given category, there may be multiple different hardware variations. For example, in a smartphone category, thereby may be various different hardware variations of Android devices, various different hardware variations of iOS devices, and so on. These hardware variations may affect screen size, aspects ratio, resolution, input device characteristics, and so on.
- For a given hardware variation, there may be multiple operating system variations. For example, two iPhone 6 models may have substantially identical hardware, but implement different version of the iOS operating system. This may affect, for example, how a touch screen device responds to certain gestures (for example opening of an operating system level menu subject to a swipe from the lower edge). Such variations may have an effect on how game user interface components are configured (for example to avoid having controls that close to that lower edge, which could result in unintentional operating system level menu access).

Furthermore, the various client devices may execute different software application through which to access casino type games. This may result in further variation. For example, a given device having a given operating system may be configured to execute one or more web browser applications via which user interface components for gaming may be rendered, and/or one or more proprietary applications via which user interface components for gaming may be rendered.

In practice, a given client device launches a software application from which casino-type gaming is to be accessed. This may be a proprietary application which is configured to enable a user to select a desired game, or a web browser application which is used to navigate to a specific web page from which the user is enabled to select a desired game. Both cases are generically referred to as the "client gaming app" for the present purposes.

Figure 1B:
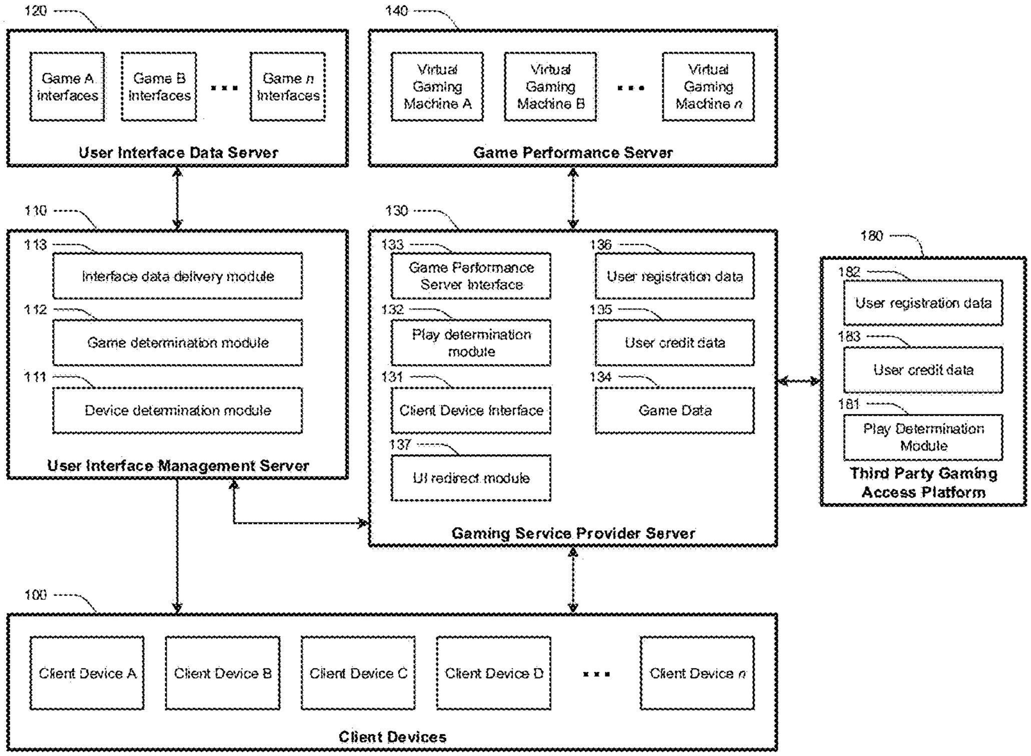
Figure 1C:
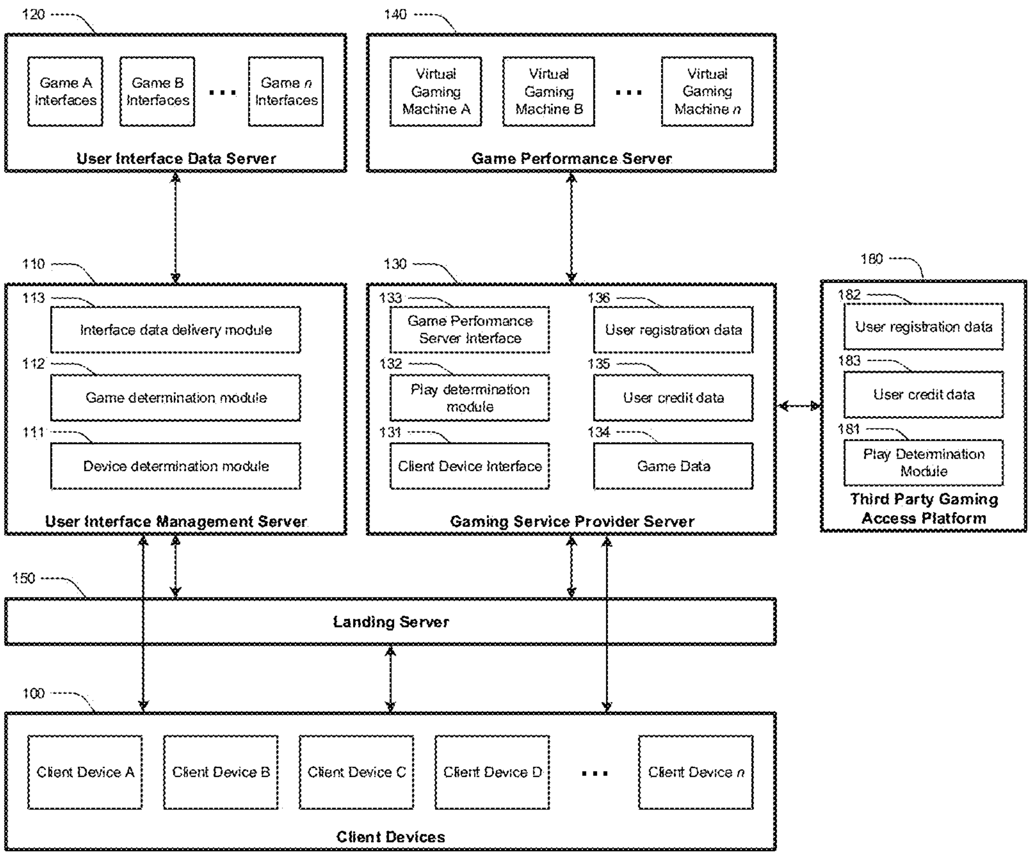

The client gaming app configures a given client device 100 to communicate with a user interface management server 110, and a gaming service provider server 130. In the example of FIG. 1A, the client device communicates directly with each (although this may be 'directly' via one or more intermediate servers). However, in some cases (such as shown in FIG. 1B) the gaming service provider server may implement a UI redirect module, such that communication between the client device and user interface management server is initiated via the gaming service provider server. Alternately, as shown in FIG. 1C, a landing server 150 may act as an intermediary to initiate and/or enable communication between a client device and either or both of servers 110 and 130.

Regardless of the precise manner of technological interaction, at a functional level user interface management server 110 is responsible for making a determination as to user interface components that are to be downloaded to a given client device. To this end, server 110 includes a device determination module 111, which determines characteristics of a given client device 100 which has requested to access a game.

These characteristics include some or all of the following:

- The device hardware (for example from a set of possible hardware devices).
- The device operating system (for example from a set of possible device operating systems).
- The client gaming app being used (for example from a set of possible client gaming apps).

A game determination module 112 determines which game is to be played. Then, based on the game to be played, and the characteristics of the given client device 100, an interface data delivery module is configured to identify appropriate user interface data from a user interface data server 120, and arrange for that data to be downloaded to the client device. Upon the code defining the user interface components being downloaded, the client device is configured to render that code thereby to provide graphical stimuli via one or more of the rendered user interface components. This is in essence a graphical user interface for the relevant game, enabling the user to provide input to control the game, and observe visual stimuli representative of the performance and outcomes of the game.

Although only a single server 110 is illustrated, there may be multiple such servers. Furthermore, a given server 110 may be defined by multiple discrete and/or distributed computing components that collectively provide the functionality of the described server 110.

Gaming service provider server 130 provided a client device interface, which is configured to communicate with the respective client gaming apps executing at each client device. Gaming service provider server 130 also provides a game performance server interface 133, which is configured to interact with a game performance server 140, which in turn provides multiple virtual gaming machines (VGM A to VGM n). Game performance server maintains access to a repository of game logic data, which includes code defining game logic data for each available game.

Each VGM is configured to provide a respective game, for example by executing the game logic data for that game. In some embodiments a unique virtual gaming machine is initiated for each unique combination of a user and a desired game. In other embodiments multiple users are able to substantially concurrently use the same VGM (for example successive game instances may result from gameplay by different players).

In the example of FIG. 1A, server 130 acts as an intermediary between a given client device 100 and game performance server 140. However, in other embodiments each client device 100 communicates directly with the game performance server, which independently communicates with the game service provider server thereby to validate credit availability and so on.

Gaming service provider server 130 executes a play determination module 132. This module is responsible for determining whether a specific gameplay instance (e.g. a "spin" on a slot machine) is to be allowed, for example based on a relationship between the amount of credit required for that gameplay instance (which may be defined based on a user-defined wager) and an amount of available credit (stored in a repository of user credit data 135). Such a validation is preferably performed prior to authorising each gameplay instance, thereby to ensure that a player has sufficient credit to cover a desired wager. This, in some embodiments, allows monitoring even in cases where a given user (defined by a single record in a repository of user registration data 136, having a value of associated credit in repository of user credit data 135) participates in multiple concurrent gaming sessions (for example using multiple client devices and/or multiple virtual gaming machines).

In the example of FIG. 1A, gaming service provider server 130 interacts with a third party gaming access platform 180 in determining whether each specific gameplay instance is to be allowed. Specifically, play determination module 132 of server 130 interacts with play determination module 181 of server 180. Third party gaming access platform 180, in this embodiment, is provided by an entity responsible for providing users with access to gaming. This includes responsibility for determining whether a specific user (defined in user registration data 182) is permitted to place a wager for a given game instance, for example taking into consideration limits on wagers, maximum bets, hourly play limits, jurisdictional requirements/regulations, and so on. It additionally includes determining whether the user has sufficient user credit (as defined in user credit data 183) to place a wager for a given desired game instance. Credit data 183 maintains a real-time record of credit associated with a user. The credit data is updated for each instance of gameplay (for example in terms of a reduction whether credit is consumed as a wager, or in terms of an increase where a prize is awarded). When providing an "approval" signal to server 130, user credit data 183 is decreased by the relevant wager amount. It is also subsequently able to be increased subject to input from server 130 (for example where prizes are won).

In some embodiments functionalities of server 180 are provided by server 130 (for example server 180 is no longer a "third party" server).

Gaming service provider server 130 maintains repositories of game data 134 indicative of available games, which enables a client device to display available games for selection by a user, user registration data 136, which maintains user records which respectively uniquely identify each user, and in some embodiments user credit data 135, which maintains a real-time record of credit associated with a user. The credit data is updated for each instance of gameplay (for example in terms of a reduction whether credit is consumed as a wager, or in terms of an increase where a prize is awarded).

Figure 1D:
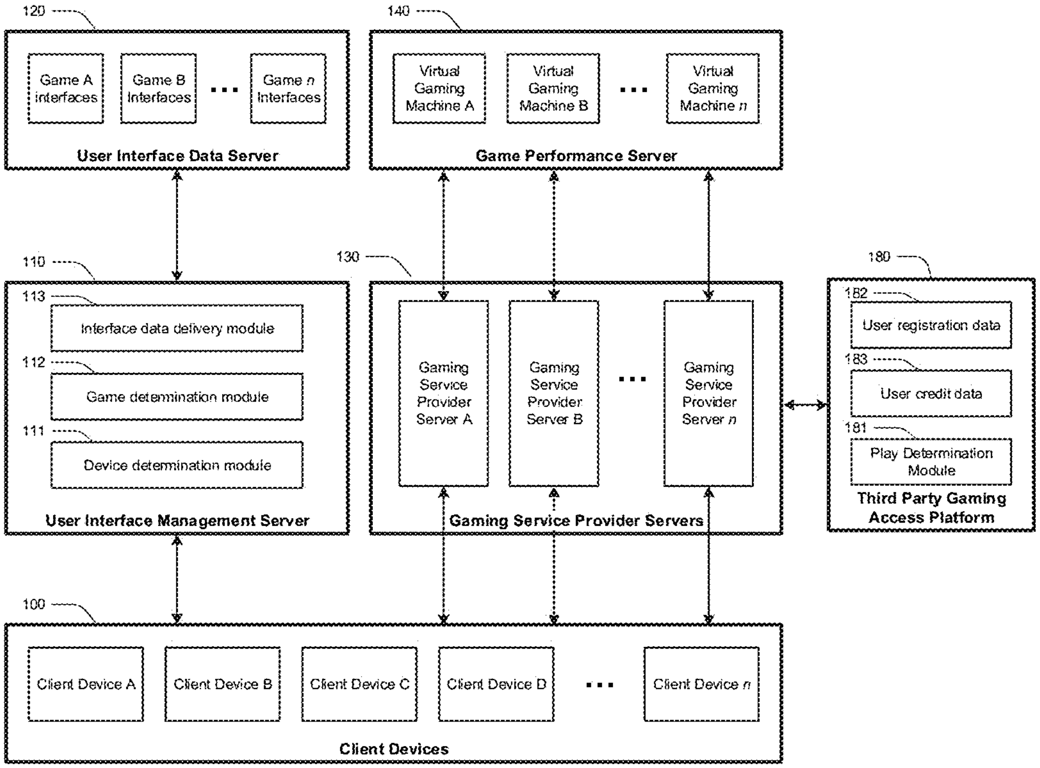

Although only a single server 130 is illustrated in FIG. 1A, there may be multiple such servers (as shown in FIG. 1D). Furthermore, a given server 130 may be defined by multiple discrete and/or distributed computing components that collectively provide the functionality of the described server 110. In some cases each server 130 interacts with a respective one or more game performance servers. It should also be appreciated that a server 130 and server 110 may be provided by common hardware (e.g. by a single server).

Figure 1E:
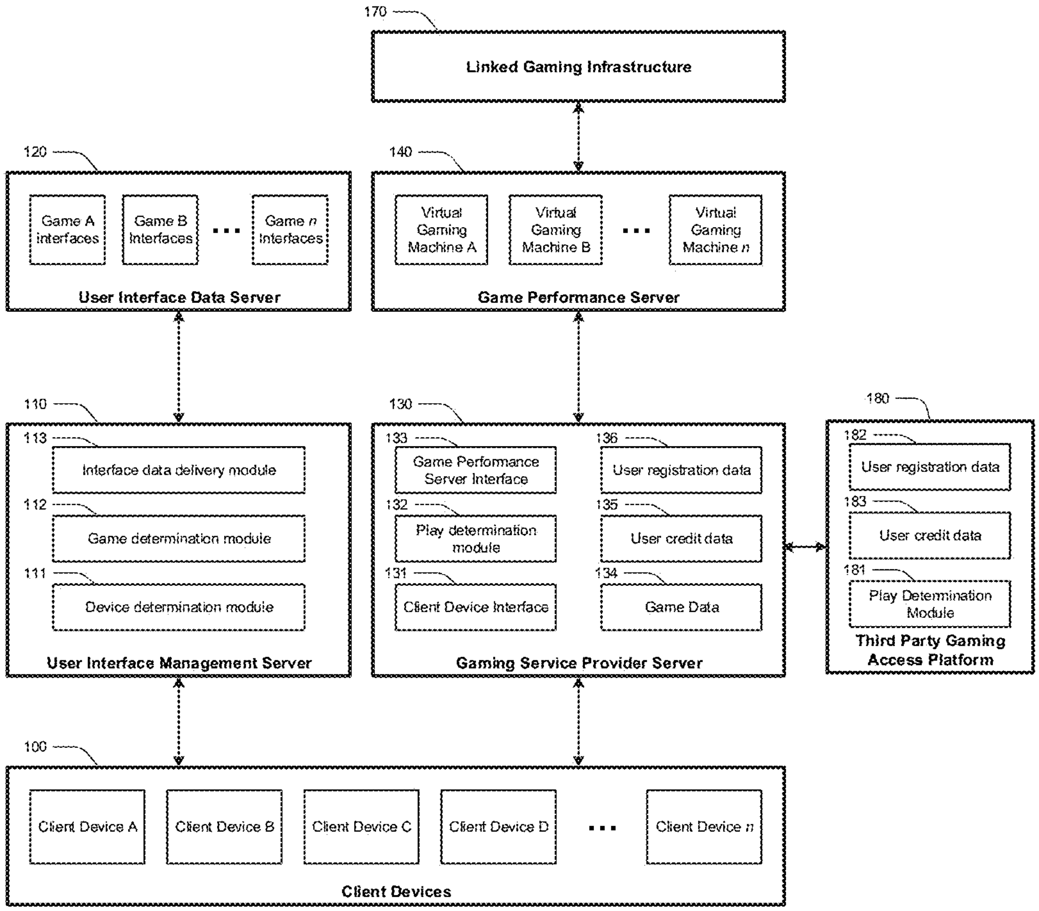
Figure 1F:
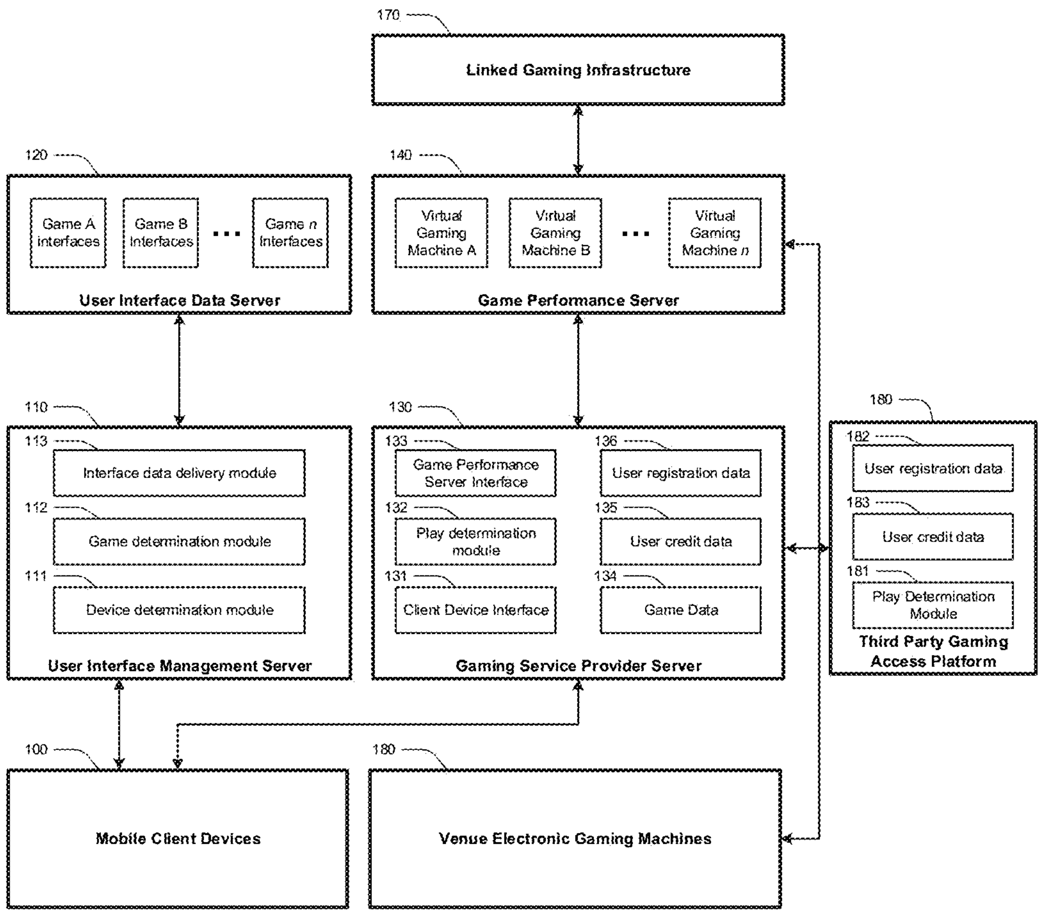

As shown in FIG. 1F, an arrangement may be implemented whereby game performance server 140 provides VGMs in respect of which user interfaces are provide on a combination of both mobile client devices and venue electronic gaming machines 180. In the case of the latter, client gaming machines may be provide in venues, these being configured to provide the user interface for one or more games executed at server 140. In some cases each venue electronic gaming machine provides its own internal credit management infrastructure (for example bill and/or ticket acceptors), which may take the place of a gaming service provider server 130.

FIG. 1E shows an arrangement whereby game performance server 140 is coupled to linked gaming infrastructure 170. Linked gaming infrastructure 170 may include one or more linked game controllers, such as jackpot controllers (for example mystery or progressive jackpot controllers). Although illustrated as a single component, a plurality of such controllers could be geographically distributed. VGMs interact with linked gaming infrastructure in substantially the same manner as conventional physical gaming machines (for example by providing a signal representative of contribution, and receiving signals representative of prizes). In some cases, a linked game controller is configured to support one or more VGMs in addition to one or more physical venue electronic gaming machines (see FIG. 1G).

Figure 1G:
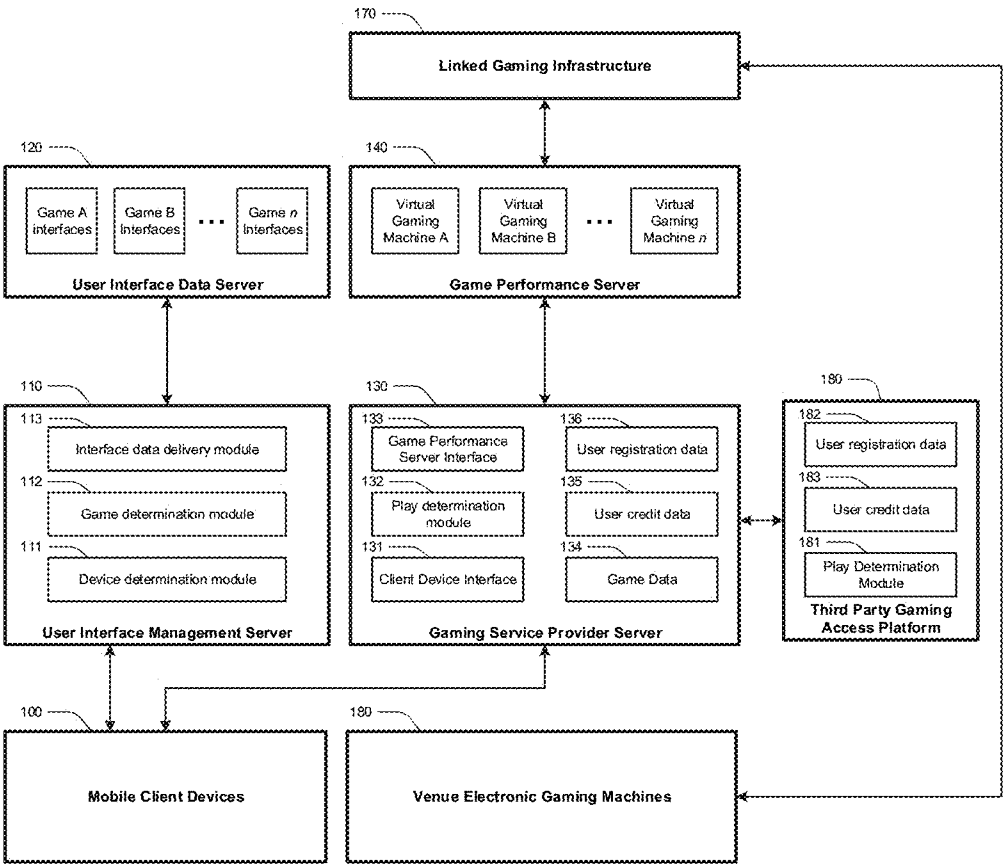
Figure 1H:
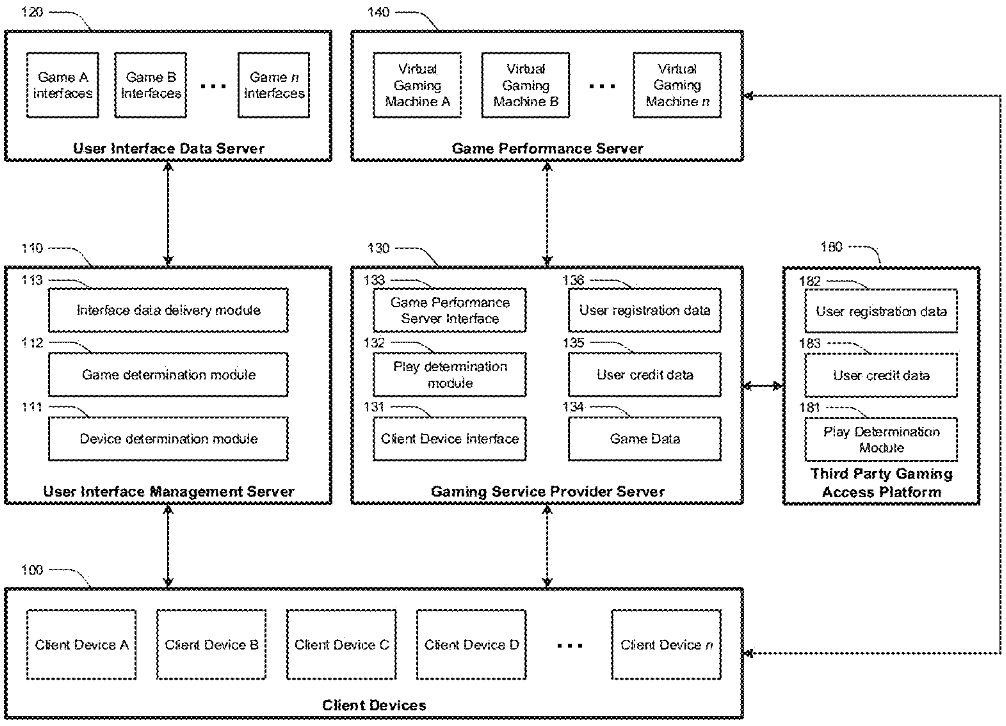

In the examples of FIG. 1F and FIG. 1G, an arrangement may be implemented whereby linked gaming infrastructure 170 operates in conjunction with games that are provided both via mobile client devices and venue electronic gaming machines 180. This allows users to participate in desired linked games associated with physical venues using their own personal devices. Accordingly, users may identify that a jackpot game at a particular venue is likely to be awarded, and decide to participate in that linked game without a need to physically visit the venue (by playing a VGM associated with the venue using their client device).

Exemplary Methods

Figure 2A:
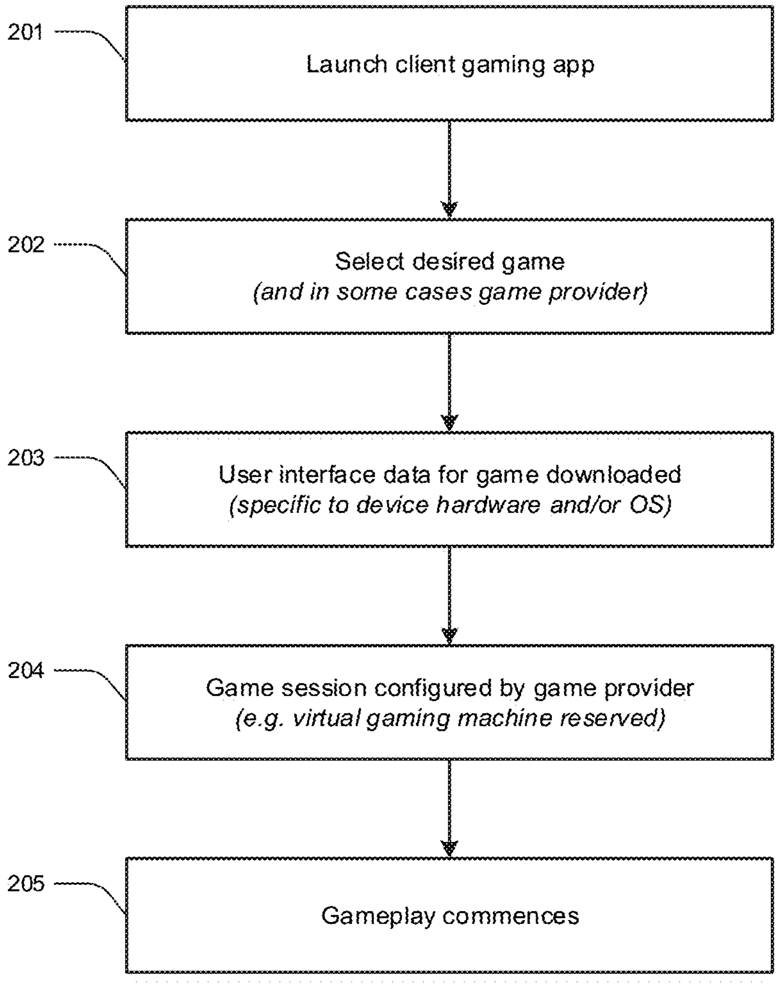
FIG. 2A illustrates a method according to one embodiment.

FIG. 2A illustrates a method according to one embodiment, being a method for gaming via a client device 100.

Functional block 201 represents a process including a client gaming app being launched at a client device 100. In cases where the client gaming app is a web browser, block 201 additionally represents navigation to a web page from which gaming functionalities are accessed.

Functional block 202 represents a process including selecting a desired game, for example from a list of available games. There may be an additional sub-process of selecting a game provider (for example a particular gaming venue, virtual gaming venue, or the like). In some embodiments the app is inherently associated with a particular game provider.

Functional block 203 represents a process including downloading code representing device/OS specific user interface components for the selected game. These are obtained (directly or indirectly) from server 110. These are rendered on-screen thereby to provide a visual representation of the game that is optimised for the user's specific device hardware and/or operating system.

Functional block 204 represents a process including configuring a game session with a virtual gaming machine. This configured the game server that provides the virtual gaming machine to verify credit availability prior to each gameplay instance (for example via communication with a gaming service provider server that maintains user credit records). In some embodiments this includes an interaction with a third party platform that is responsible for providing an approve/reject signal for each instance of gameplay, based on user credit, user attributes (for example maximum bet limits and the like), and other factors. Gameplay then commences at 205.

Figure 2B:
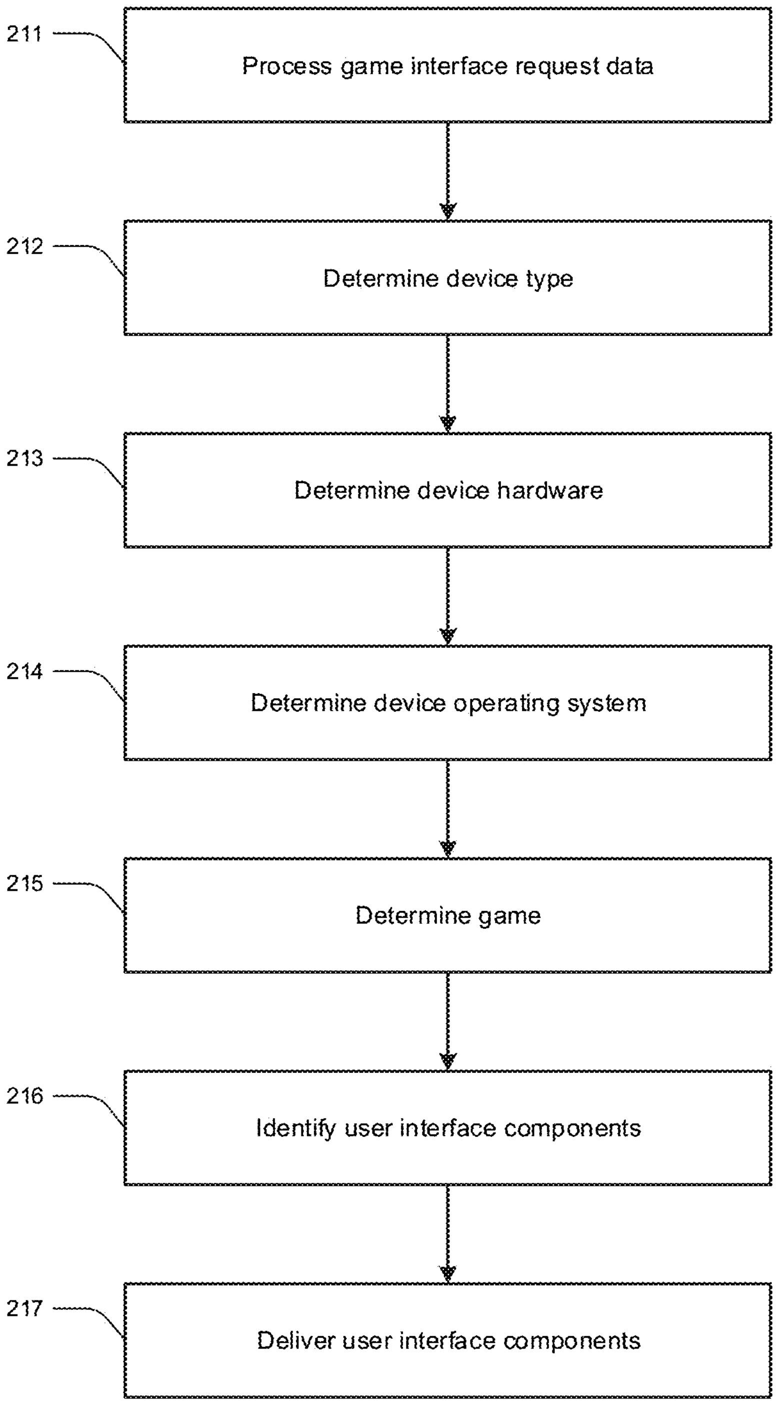
FIG. 2B illustrates a method according to one embodiment.

FIG. 2B illustrates a method performed by server 110 according to one embodiment. Functional block 211 represents a process including processing game interface request data. This data is indicative of a specific game, and one or more characteristics of a client device on which the game is to be rendered (for example device type, device hardware, operating system, game app, and so on). In some embodiments server 110 obtains this data in response to the request. Determinations are made thereby to identify appropriate user interface components at 216, and these are delivered (directly or indirectly) to the relevant client device at 217.

Exemplary Client Device

Figure 3A:
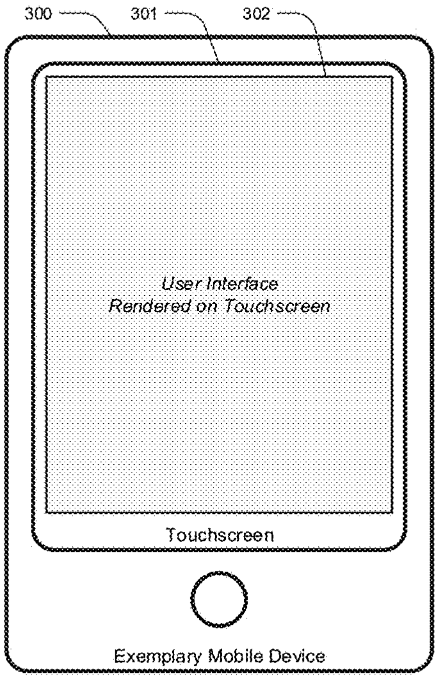
FIG. 3A to FIG. 3C illustrate client devices according to embodiments.
Figure 3B:
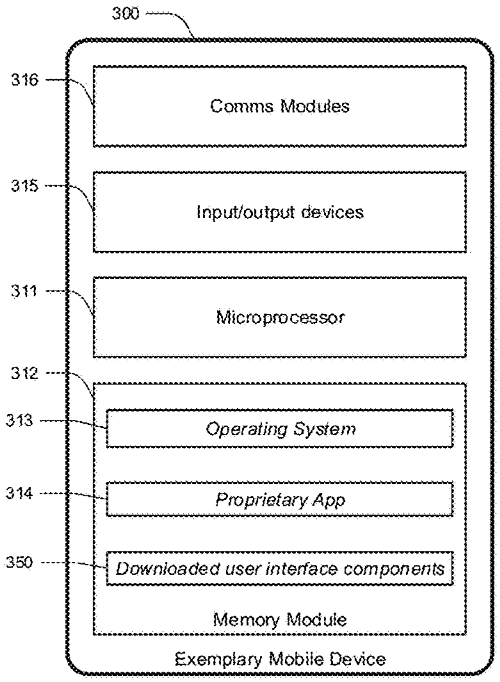
Figure 3C:
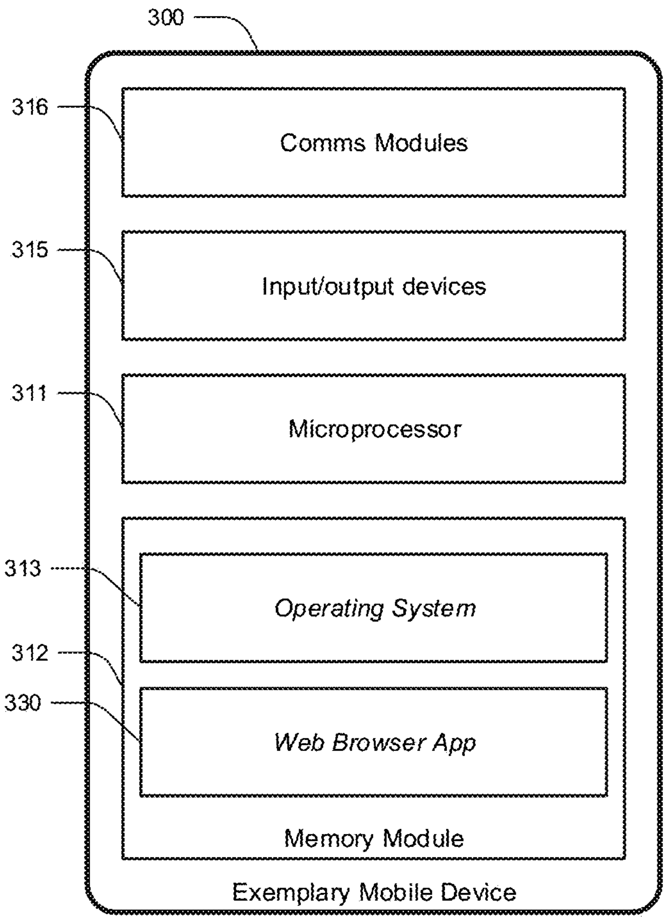

FIG. 3A and FIG. 3B schematically illustrate an exemplary client device 100 in the form of a mobile device 300. Mobile device 300 includes a touchscreen 301 on which a user interface 302 is rendered. The user interface includes components obtained (directly or indirectly) from server 110, for example via the method of FIG. 2B. FIG. 3B schematically illustrates components of device 300: communications modules 316 (such as cellular and WiFi) which enable communication with remote servers; input/output devices 135 (such as touchscreen 302, buttons, speakers, etc.); a microprocessor 311; and a memory module 312 that maintains software instructions and other computer readable code that is executable via the microprocessor. In this example the memory module stores an operating system 313, proprietary client gaming app 314, and downloaded user interface components 350 that are rendered by app 314. In the example of FIG. 3C a web browser is used as an alternative to a proprietary app.

Exemplary Use Cases

Figure 4:
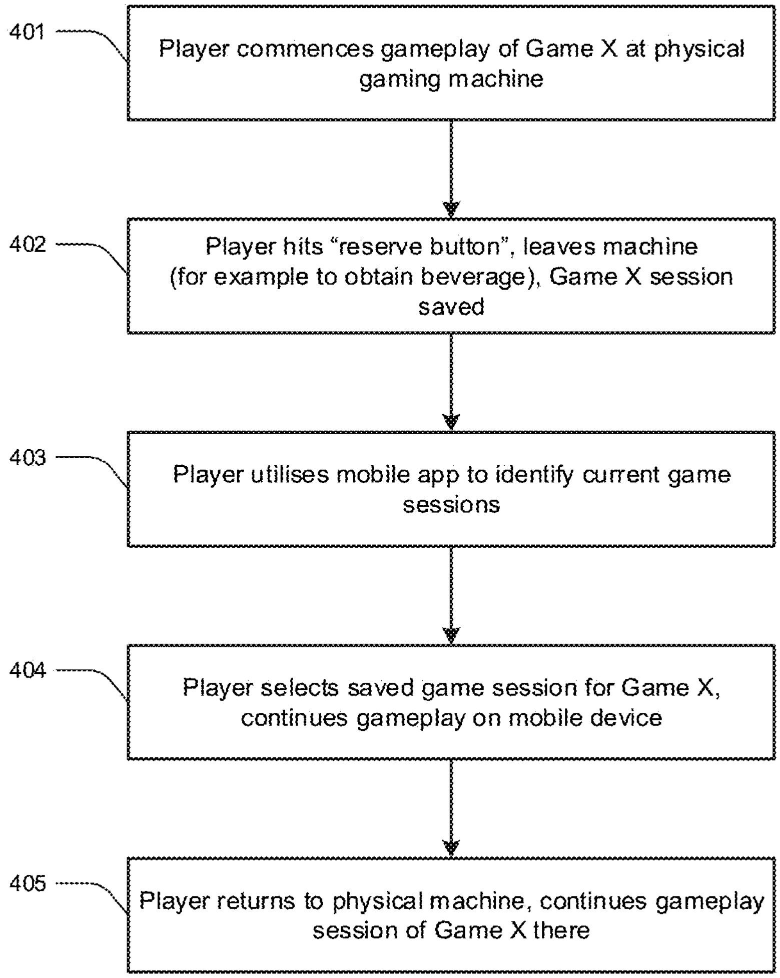
FIG. 4 illustrates an exemplary use case.

In the example of FIG. 4, a user continues playing a particular game whilst at and away from a particular machine. At 401, the player commences gameplay of a game, Game X, at a physical gaming machine in a casino. This includes a player identification process. The player then, at 402, hits a “reserve” button or the like, to reserve the game whilst away from the physical machine (for example the player walks to a bar or bathroom). Whilst away from the machine, the player utilises his/her mobile device at 403, which executes a gaming app. This gaming app shows to the player a set of one or more active gaming sessions associated with the user, which includes the session at Game X. The user then, at 404, continues to play Game X via a user interface downloaded to the mobile device. Upon returning to the physical machine at 405, the user is able to continue gameplay, with the session on the physical machine reflecting the intervening mobile device session. This is achieved, in this embodiment, by virtue of all gaming sessions being conducted at a cloud-hosted virtual gaming machine, with each of the physical gaming machine and mobile device providing user interfaces that display such a game session. A similar use case allows a user to initiate a game session from a personal device at home (or another location) in respect of a given game, and later continue that game session at a physical gaming machine in a casino or other venue. Alternately, this may be reversed, with the player commencing gameplay at a casino, and later continuing at home.

Exemplary Game Implementation Methods

Figure 5A:
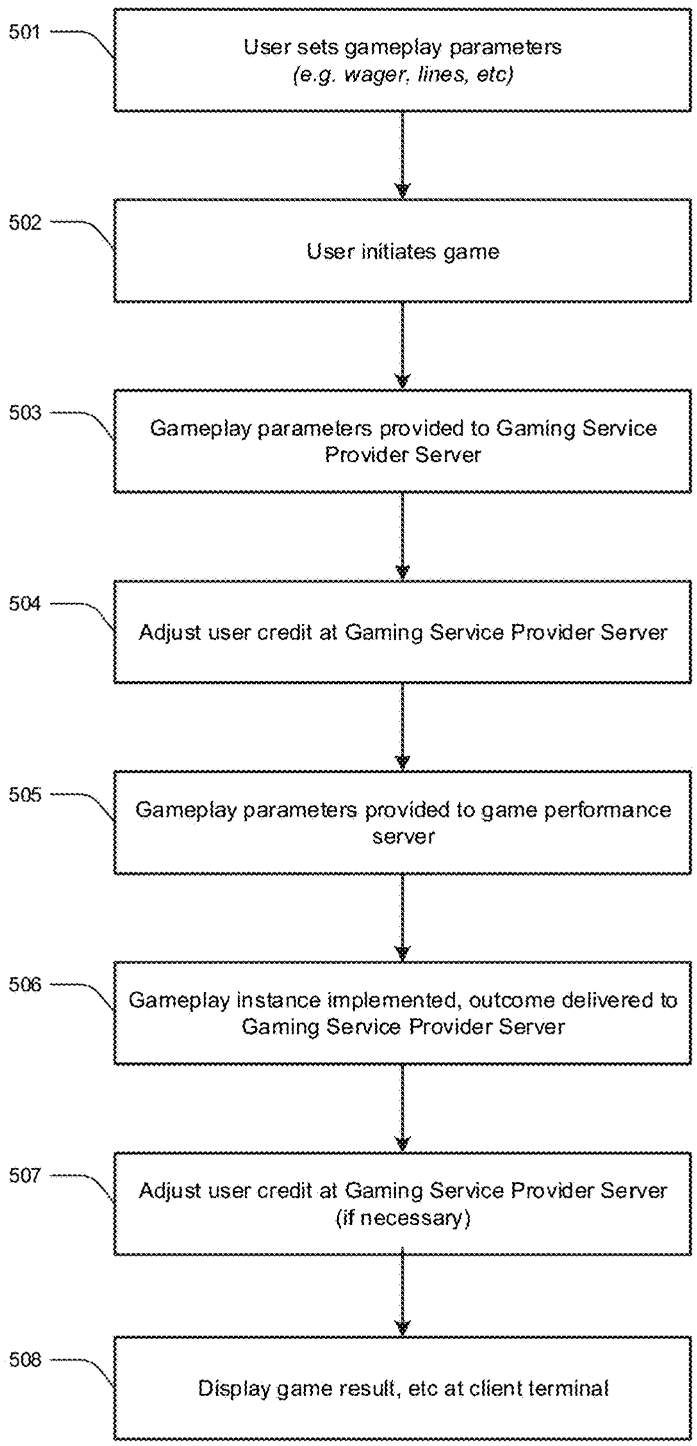
FIG. 5A illustrates a method according to one embodiment.

FIG. 5A illustrates a method for gameplay implementation.

Functional block 501 represents a process whereby a user operates his/her device thereby to set gameplay parameters (such as a wager, number of lines to be played, and so on). Then, at 502, the user initiates gameplay (for example by clicking a “play” object. The gameplay parameters are transmitted to the gaming service provider server at 503. The user’s credit is then adjusted to account for the wager at 504, and the gameplay parameters transmitted to the game performance server at 505 such that a gameplay instance in conducted with the parameters is performed by the relevant VGM. The gameplay instance is implemented and outcome communicated to the gaming service provider server at 506. In the case of a win, the user’s credit is increased at 507. The result of the gameplay, credit changes, and so on are displayed at the client terminal at 508. In some embodiments the user interface rendering at the client terminal is configured to render a predefined animation throughout the delay between 502 and 508, for example spinning wheels on a slot machine.

Figure 5B:
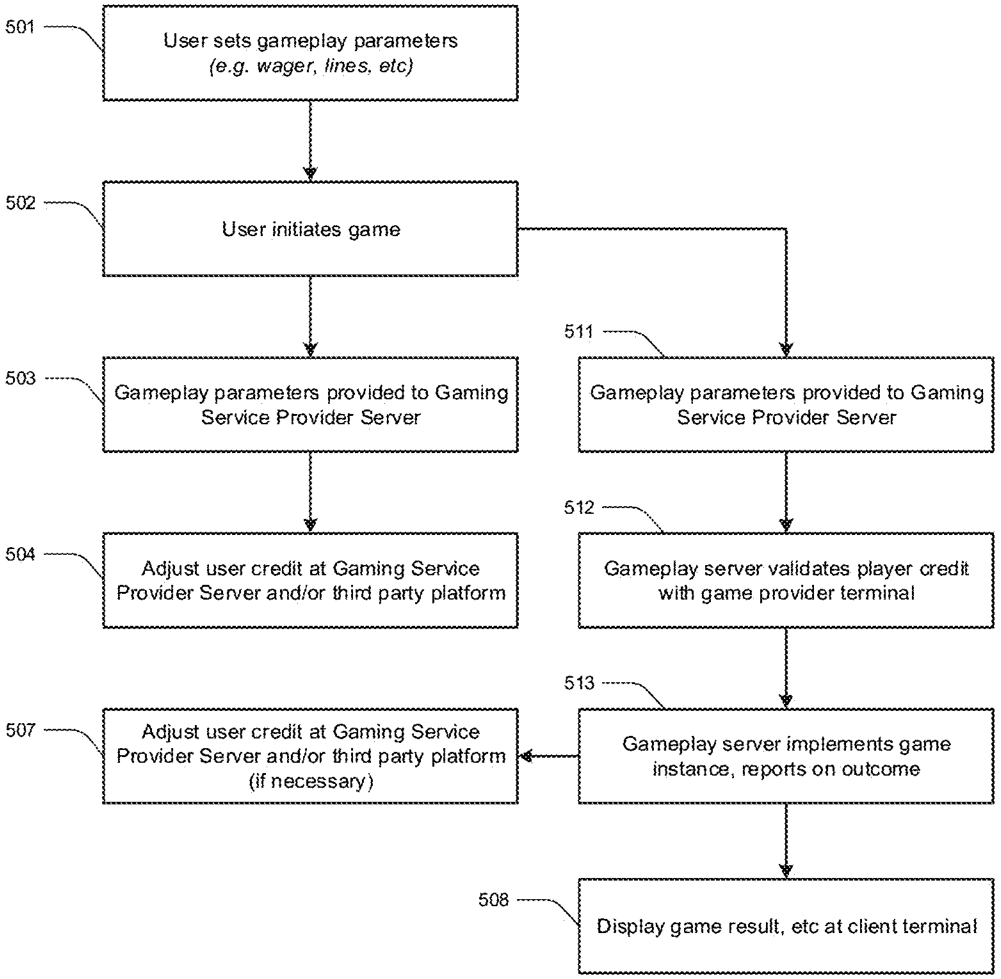
FIG. 5B illustrates a method according to one embodiment.

FIG. 5B illustrates a variation wherein the user initiates a game directly with the VGM, and the game provider server is responsible for verifying with the game service provider terminal that the relevant user has sufficient credit for the desired gameplay instance (optionally via interaction with a third party platform).

Figure 5C:
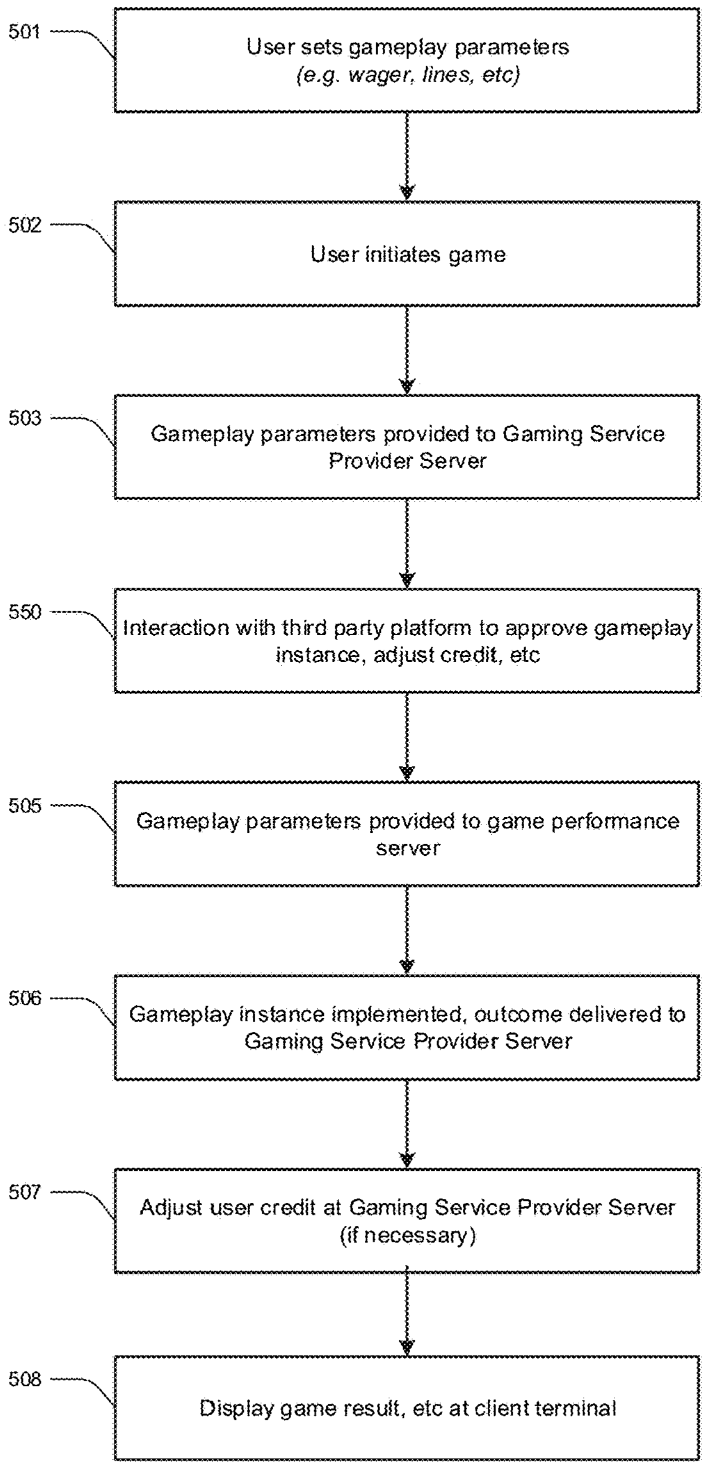
FIG. 5C illustrates a method according to one embodiment.

FIG. 5C illustrates a variation of FIG. 5A where each gameplay instance is approved/rejected subject to interaction with a third party platform. In this regard, functional block 550 represents a process including an interaction with third party platform to approve gameplay instance, adjust credit, and so on.

Framework for Defining Game Interface Data for Multiple Client Devices

Figure 6:
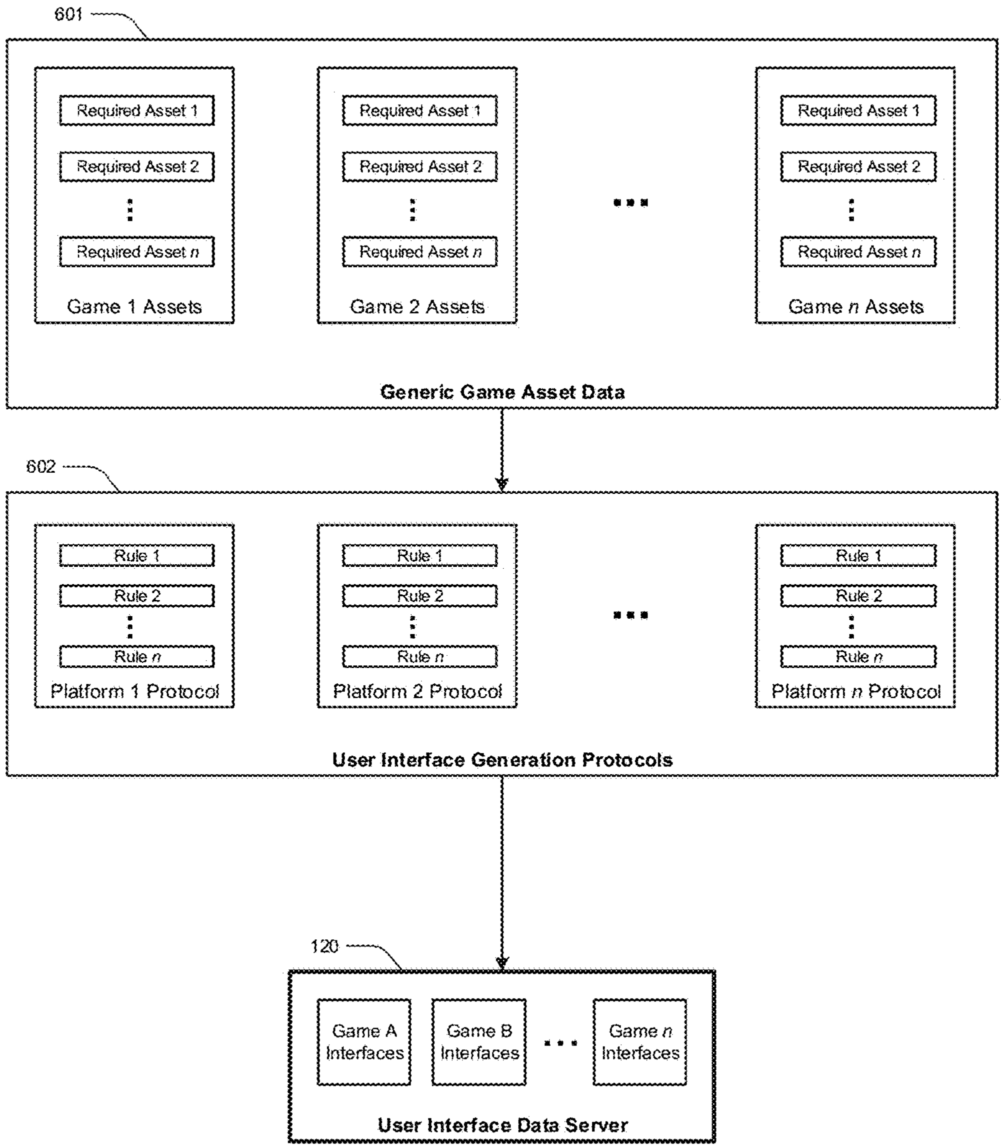
FIG. 6 illustrates a framework for defining interface data.

Some embodiments make use of a framework for streamlining defining of game interface data for multiple client device devices. One embodiment is described by reference to FIG. 6.

In this example, game developers/designers are provided with a details of a required set of assets required for a game. This includes some or all of the following: image files (each image at a specified minimum resolution), sound files (for example in a specified format or formats), game mathematics and rules, animations, and so on. This defines a set of assets (preferably being a minimum set of assets) that is required to define game interface data independent of client platform. Game asset data 601 is maintained for a plurality of games.

For each client platform (e.g. combination of a device hardware an operating system) a user, a user interface generation protocol is defined. Each protocol includes a set of rules for transforming game asset data for a particular platform. By way of example, this may include transforming images in the game asset data to particular formats and/or resolutions, concerting sound into a required format, and so on. A set of user interface generation protocols is defined.

In some embodiments, each time a new set of game assets is added, all existing user interface protocols are run, thereby to define a respective set of game interfaces (one or each protocol). This allows the new game to be made available on all of those platforms.

Likewise, in some embodiments each time a new platform specific protocol is added, that protocol is run against each set of game assets, thereby to define game interfaces for all games in respect of the new platform.

Using such an approach, games are able to be quickly and efficiently rolled out across multiple platforms without a need for game designers/developers to provide (or continually provide) new asset data in a platform specific manner.

Conclusions and Interpretation

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A computer implemented method, performed by a client terminal, for providing a casino-type game at the client terminal, the method including:

defining a request to play a user-selected game at the client terminal;

in response to the defining of the request, downloading, from a first remote server, a set of computer executable code that enables rendering of graphical user interface components for the user-selected game, the graphical user interface components configured to receive input to control the game and to display graphical stimuli representative of the performance and outcomes of the game, wherein the set of computer executable code is identified based on (i) the user-selected game; and (ii) one or more characteristics of the client terminal including the hardware and operating system of the client terminal;

in response to a user interaction with a specific one or more of the rendered user interface components at the client terminal, defining upstream game performance data for transmission to a second remote server, and to a gameplay instance implemented at a remotely executing virtual gaming machine on the second remote server that provides the user-selected game; and providing graphical stimuli via one or more of the rendered user interface components in response to downstream game performance data received by the client terminal from the second remote server, the downstream game performance data being defined subject to completion of the gameplay instance once implemented at the remotely executing virtual gaming machine that provides the user-selected game.

2. A method according to claim 1 wherein the one or more characteristics of the client terminal include a device hardware type.

3. A method according to claim 1 wherein the one or more characteristics of the client terminal include a device operating system.

4. A method according to claim 1 wherein the gameplay instance is implemented subject to a wager verified by a gaming service provider server.

5. A method according to claim 1 wherein:

the set of computer executable code that enables rendering of graphical user interface components for the user-selected game is downloaded from the first server;

the virtual gaming machine executes at the second server remote of the first server; and data indicative of player credit used to play the virtual gaming machine is stored at a third server remote of the first and second servers.

6. A method of providing casino-type games to a plurality of distributed users, the method including:

providing a plurality of playable games;

in response to a request associated with a given user, initiating a virtual gaming machine on a remote server to provide a specific one of the games selected by the specific user;

implementing wager-based play on the game at the virtual gaming machine on the remote server, subject to interaction with a gaming service provider player which maintains data indicative of gaming credit associated with the given user;

providing from another remote server a graphical user interface configured to receive input to control the game and to display graphical stimuli representative of the performance and outcomes of the game at a client device associated with the given user;

wherein the graphical user interface components are specific to (i) the user-selected game; and (ii) one or more characteristics of the client terminal including the hardware and operating system of the client terminal, and the one or more user interface components are downloaded from the another remote server.

7. A method according to claim 6 wherein the user is enabled to control the specific game provided by the virtual gaming machine via multiple client devices associated with the user, wherein a first one of the multiple client devices has a first set of hardware and operating system characteristics, wherein a second one of the multiple client devices has a second set of hardware and operating system characteristics; and wherein the one or more user interface components rendered on the first one of the client devices are provided to the first one of the client devices responsive to identification of the first set of hardware and operating system characteristics, and wherein the one or more user interface components rendered on the second one of the client devices are provided to the second one of the client devices responsive to identification of the second set of hardware and operating system characteristics.

8. A method according to claim 7 wherein the user is enabled to play a first gameplay instance using the first one of the client devices and a second gameplay instance, successively following the first gameplay instance, using the second one of the client devices.

9. A method according to claim 6 wherein the plurality of playable games are each playable on any one of a set of client device types, wherein the client device types include at least two of: personal computers, smartphones tablets, and electronic gaming machine terminals.

10. A computer implemented method for providing a linked jackpot game, the method including:

receiving input indicative of gameplay at a plurality of virtual gaming machines, wherein each virtual gaming machine is controlled by a user of a remote client device, wherein the client devices include:

a first one of the client devices that has a first set of hardware and operating system characteristics, wherein the first client device renders user interface components that are optimised for the first set of hardware and operating system characteristics, the user interface components downloaded from a remote server;

a second one of the multiple client devices that has a second set of hardware and operating system characteristics, wherein the second client device renders user interface components that are optimised for the second set of hardware and operating system characteristics, the user interface components downloaded from the remote server; and conducting a linked game based on the received input at another remote server.

11. A method according to claim 10 wherein each client terminal is configured to:

download, from a first remote server, a set of computer executable code that enables rendering of graphical user interface components for the user-selected game, wherein the set of computer executable code is identified based on (i) the user-selected game; and (ii) one or more characteristics of the client terminal;

in response to a user interaction with a specific one or more of the rendered user interface components, define upstream game performance data for transmission to a second remote server, thereby to enable a gameplay instance to be implemented at a remotely executing virtual gaming machine that provides the user-selected game; and provide graphical stimuli via one or more of the rendered user interface components in response to downstream game performance data received by the client terminal, the downstream game performance data being defined subject to completion of the gameplay instance once implemented at the remotely executing virtual gaming machine that provides the user-selected game.

12. A method according to claim 10 including additionally receiving input from a plurality of gaming machines executing in a venue, wherein each of the plurality of gaming machines executing in a venue and each of the plurality of virtual gaming machines controlled by a user of a remote client devices compete in the same linked game.

13. A method according to claim 11 including additionally receiving input from a plurality of gaming machines executing in a venue, wherein each of the plurality of gaming machines executing in a venue and each of the plurality of virtual gaming machines controlled by a user of a remote client devices compete in the same linked game.

14. A computer system configured to perform a method according to claim 1.

15. A computer system configured to perform a method according to claim 10.

16. A non-transitory carrier medium carrying computer executable code that, when executed on a processor, causes the processor to perform a method according to claim 1.

17. A non-transitory carrier medium carrying computer executable code that, when executed on a processor, causes the processor to perform a method according to claim 10.

* * * * *